(12) United States Patent
Masuyama et al.

(10) Patent No.: US 9,578,510 B2
(45) Date of Patent: Feb. 21, 2017

(54) SYSTEM AND METHOD FOR WIRELESS HANDHELD DEVICE SECURITY IN A DATA CENTER ENVIRONMENT

(71) Applicant: Dell Products, LP, Round Rock, TX (US)

(72) Inventors: Jinsaku Masuyama, Cedar Park, TX (US); Sajjad S. Ahmed, Round Rock, TX (US); John R. Palmer, Georgetown, TX (US)

(73) Assignee: DELLS PRODUCTS, LP, Round Rock, TX (US)

( * ) Notice: Subject to any disclaimer, the term of this patent is extended or adjusted under 35 U.S.C. 154(b) by 0 days.

(21) Appl. No.: 14/618,051

(22) Filed: Feb. 10, 2015

(65) Prior Publication Data

US 2016/0234688 A1    Aug. 11, 2016

(51) Int. Cl.
| | |
|---|---|
| *H04M 1/66* | (2006.01) |
| *H04W 12/08* | (2009.01) |
| *H04W 4/00* | (2009.01) |
| *H04W 12/04* | (2009.01) |
| *H04W 84/12* | (2009.01) |

(52) U.S. Cl.
CPC ............. *H04W 12/08* (2013.01); *H04W 4/008* (2013.01); *H04W 12/04* (2013.01); *H04W 84/12* (2013.01)

(58) Field of Classification Search
CPC ...... H04W 12/06; H04W 12/08; H04W 4/008; H04W 76/02; H04W 12/04; H04L 67/303; H04L 63/0492; H04L 2209/24; H04L 63/0435;H04L 63/045; H04L 63/061; H04L 63/0807; H04L 63/0892; H04L 63/123
USPC ........................................................ 455/411
See application file for complete search history.

(56) References Cited

U.S. PATENT DOCUMENTS

| | | |
|---|---|---|
| 5,335,985 A | 8/1994 | Baur |
| 5,434,775 A | 7/1995 | Sims et al. |
| 5,505,533 A | 4/1996 | Kammersqard et al. |
| 5,774,668 A | 6/1998 | Choquier et al. |
| 5,805,442 A | 9/1998 | Crater et al. |
| 5,869,820 A | 2/1999 | Chen et al. |
| 5,910,776 A | 6/1999 | Black |
| 5,913,034 A | 6/1999 | Malcolm |
| 5,926,463 A | 7/1999 | Ahearn et al. |
| 5,956,665 A | 9/1999 | Martinez et al. |
| 5,956,723 A | 9/1999 | Zhu |
| 5,959,012 A | 9/1999 | Simonian et al. |
| 6,057,981 A | 5/2000 | Fish et al. |
| 6,112,246 A | 8/2000 | Horbal et al. |
| 6,131,119 A | 10/2000 | Fukui |

(Continued)

*Primary Examiner* — Kwasi Karikari
(74) *Attorney, Agent, or Firm* — Larson Newman, LLP

(57) ABSTRACT

A data center includes an access controller with a short range wireless communication controller, and an access point with a long range wireless communication controller. The access point is coupled to the access controller via a secure link. The access controller, receives a security credential from a mobile device via the short range wireless communication controller, authenticates the mobile device, receives access information for the mobile device via the short range wireless communication controller in response to authenticating the mobile device, and provides the access information to the access point via the secure link. The access point uses the access information to connect to the mobile device via the long range wireless communication controller.

20 Claims, 4 Drawing Sheets

(56) References Cited

U.S. PATENT DOCUMENTS

| | | | |
|---|---|---|---|
| 6,167,448 | A | 12/2000 | Hemphill et al. |
| 6,282,175 | B1 | 8/2001 | Steele et al. |
| 6,601,084 | B1 | 7/2003 | Bhaskaran et al. |
| 6,654,347 | B1 | 11/2003 | Wiedeman et al. |
| 6,714,977 | B1 | 3/2004 | Fowler et al. |
| 6,826,714 | B2 | 11/2004 | Coffey et al. |
| 7,696,506 | B2 | 4/2010 | Lung |
| 7,720,987 | B2 | 5/2010 | Penk et al. |
| 8,037,330 | B2 | 10/2011 | Livescu et al. |
| 8,732,508 | B2 | 5/2014 | Cochran et al. |
| 2002/0095487 | A1 | 7/2002 | Day et al. |
| 2002/0141210 | A1 | 10/2002 | Glannopoulos et al. |
| 2003/0046339 | A1 | 3/2003 | Ip |
| 2004/0010649 | A1 | 1/2004 | Weaver et al. |
| 2007/0094426 | A1 | 4/2007 | Chiang et al. |
| 2008/0317021 | A1 | 12/2008 | Ives et al. |
| 2009/0189774 | A1 | 7/2009 | Brundridge et al. |
| 2009/0217073 | A1 | 8/2009 | Brech et al. |
| 2009/0307515 | A1 | 12/2009 | Bandholz et al. |
| 2010/0027687 | A1 | 2/2010 | De Natale et al. |
| 2010/0106154 | A1 | 4/2010 | Harlev et al. |
| 2011/0022245 | A1 | 1/2011 | Goodrum et al. |
| 2011/0179301 | A1 | 7/2011 | Liu et al. |
| 2012/0220216 | A1* | 8/2012 | Carbonell Duque  H04B 5/0031 455/26.1 |
| 2012/0262956 | A1 | 10/2012 | DeHaven |
| 2012/0303767 | A1 | 11/2012 | Renzin |
| 2013/0007249 | A1 | 1/2013 | Wang et al. |
| 2013/0227291 | A1* | 8/2013 | Ahmed ............... H04L 63/0281 713/171 |

\* cited by examiner

SYSTEM AND METHOD FOR WIRELESS HANDHELD DEVICE SECURITY IN A DATA CENTER ENVIRONMENT

FIELD OF THE DISCLOSURE

This disclosure relates generally to information handling systems, and more particularly relates to a system and method for wireless handheld device security in a data center environment.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

A data center is a facility to house a group of networked information handling systems typically used by organizations for the remote storage, processing, or distribution of large amounts of data. The data center usually includes associated components such as telecommunication systems, storage systems, power supplies, environmental controls, and security infrastructure. A data center includes a group of server racks that house the information handling systems, and that are located on floor tiles of a raised floor. A space below the raised floor can be utilized to provide an air flow from an AC system to the server racks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainty be used in this application. The teachings can also be used in other applications, and with several different types of architectures, such as distributed computing architectures, client/server architectures, or middleware server architectures and associated resources.

Figure 1:
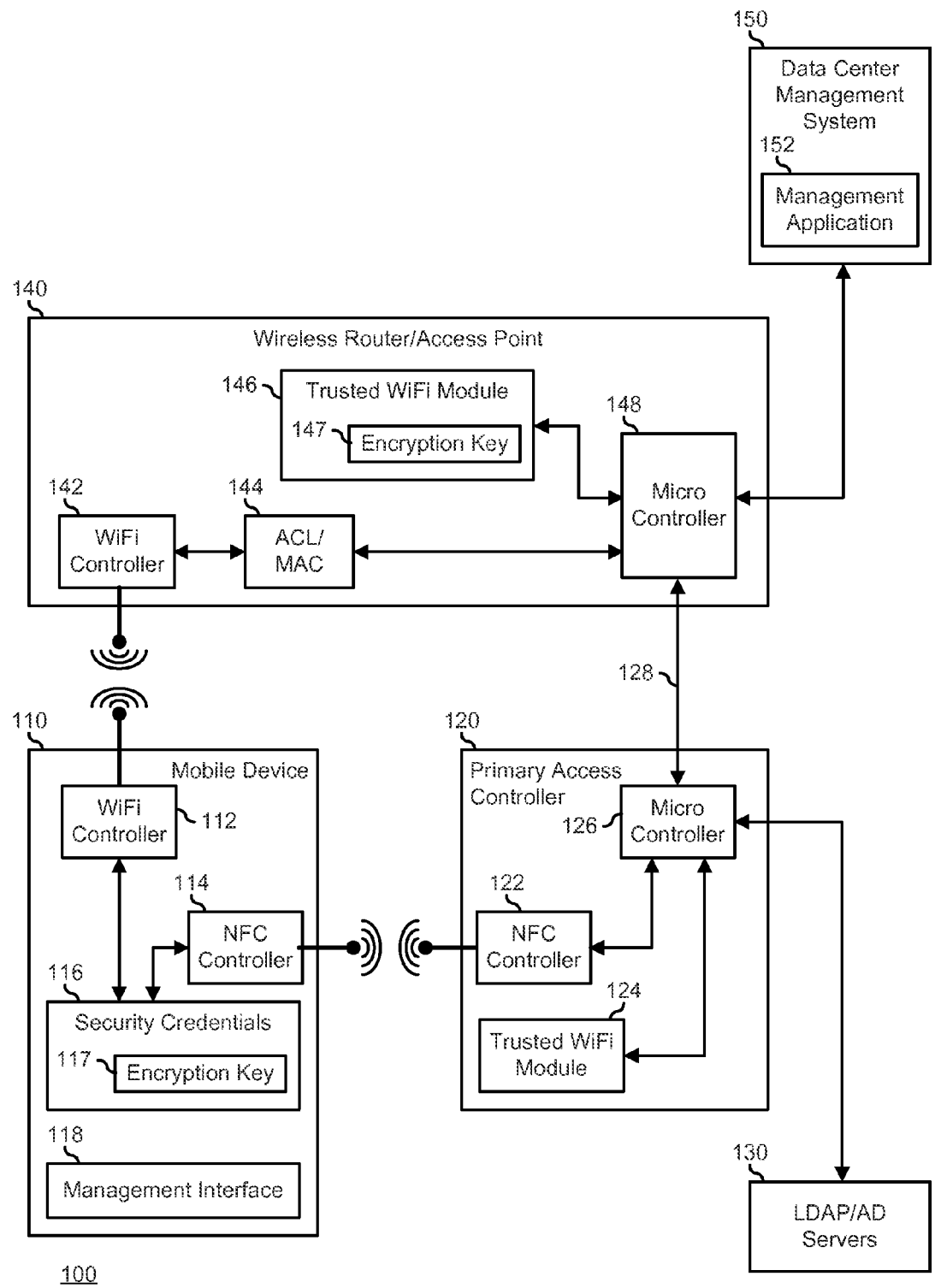
FIG. 1 is a block diagram of a secure data center according to an embodiment of the present disclosure.

FIG. 1 illustrates a secure data center 100 including a mobile device 110, a primary access controller 120, a validation server 130, a wireless router/access point (AP) 140, and a data center management system 150. Mobile device 110 includes a long range wireless communication control 112, a short range wireless communication controller 114, one or more security credential 116, and a management interface 118. Long range communication controller 112 represents a wireless communication interface that operates to communicate with another long range wireless enabled device that is up to, for example, 300 feet from the long range communication device. An example of long range communication device 112 includes a WiFi communication device according to an IEEE 802.11 specification such as 802.11a/b/n, another IEEE 802.11 specification, or a combination thereof, a Bluetooth communication device, a Code Division Multiple Access (CDMA) device, a Global System for Mobile Communications (GSM) device, another long range wireless communication device, or a combination thereof.

Short range communication device 114 represents a wireless communication interface that operates to communicate with another short range wireless enabled device that is within, for example, 18 inches of the short range communication device. An example of short range communication device 114 includes a Near Field Communication (NEC) device according to a European Computer Manufacturers Association (ECMA) Standard ECMA-340 Near Field Communication Interface and Protocol, an International Organization for Standardization/International Electrotechnical Commission (ISO/IEC) Standard ISO/IEC-14443 Standard for Identification cards Contactless integrated circuit cards proximity, another near field communication standard, or a combination thereof, a Bluetooth communication device, an optical communication device such as an infrared or LED device, another short range wireless communication device, or a combination thereof. In another example, short range communication device 114 can represent one or more of the long range communication device types as noted above, but that have been configured for short range communication. Note that, as used herein, the term long range is intended to be understood in the context of a wireless local area network (WLAN) and not in the context of regional or global wireless communications, and that the term short range is intended to be understood in the context of near-field communication and a personal area network (PAN).

Security credentials 116 includes information unique to mobile device 110 that servers to identify the mobile device, and which can be verified in order to determine the validity of the mobile device. An example of security credentials includes a username/password combination, a swipe pattern, a pattern recognition, such as a finger-print or iris scan, or another type of security credential that operates to validate the identity of a user of mobile device 110 to be authorized to utilize management interface 118 to access and control operations of data center 100 via management system 150, as described further, below.

Primary access controller 120 includes a short range wireless communication controller 122, a trusted wireless module (TWM) 124, and a microcontroller 126. Short range wireless communication controller 122 is similar to and operates compatibly with short range wireless communication controller 114. When mobile device 110 is located within the range of short range wireless communication controllers 114 and 122, communication is initiated between the mobile device and primary access controller 120. In particular, mobile device 120 communicates security credential 116 to primary access controller 120. Microcontroller 126 receives security credential 116 and verifies that the user associated with the security credential is authorized to access and control operations of data center 100 via management system 150. As such, microcontroller 126 verifies the identity associated security credential 116 by checking the security credential against a database resident on primary access controller 120 (not illustrated), or by checking the security credential against validation server 130.

Validation server 130 represents a database server for verifying security credential 116. An example of validation server 130 includes an Active Directory server, a Lightweight Directory Access Protocol (LDAP) server, another authentication and validation server, or a combination thereof. If security credential 116 is not validated by microcontroller 126, then mobile device 110 is denied access to any other resources of data center 100. In particular, mobile device 110 will not be permitted to access AP 140. Moreover, primary access controller 120 can deny physical access to data center 100, by locking an entry door to the data center, and deny connectivity to AP 140.

If security credential 116 is validated by microcontroller 126, primary access controller 120 request TWM 124 to provide an encryption key that permits the secure transmission of data via one or more of wireless communication controllers 112 and 114. The encryption key represents a symmetrical encryption key for private-private key communication, an asymmetrical encryption key for public/private key communication, such as an asymmetrical encryption key according to a Public Key Infrastructure (PKI). Where the encryption key is a private/private key encryption key, primary access controller can provide mobile device 110 with an encrypted version of the encryption key for further security.

Primary access controller 120 provides the encryption key to mobile device 110 which stores the encryption key 117 with security credentials 116. Mobile device 110 then provides access information to primary access controller 120. The access information includes a MAC address or IP address associated with tong range wireless communication controller 112, a unique identifier for mobile device 110, such as an International Mobile Station Equipment identity (IMEI) or the like, and other information for identifying the mobile device and establishing a communication link with AP 140, as needed or desired.

Microcontroller 126 operates to provide the encryption key and the access information to AP 140 via a secure link 128. Secure link 128 represents a communication link between primary access controller 120 and AP 140 that is protected from malicious activity. For example, secure link 128 can represent a hard-wired connection between primary access controller 120 and AP 140, a secure network connection between the primary access controller and the AP, or another secure link.

AP 140 includes a long range wireless communication controller 142 that is similar to and operates compatibly with long range wireless communication controller 112, an access control list/MAC address table (ACL/MAC) 144, a TWM 146, and a microcontroller 148. In a particular embodiment, secure link 128 is provided based upon a hardware key that is provided via TWMs 124 and 146. Here, TWMs 124 and 146 can be a matched pair that is paired to together by a common private/private encryption key. In another embodiment, secure link 128 is provided via a PKI public/private key encryption. Microcontroller 148 provides the encryption key to TWM 146 which stores the encryption key as encryption key 147 for use is secure communication between AP 140 and mobile device 110. Microcontroller 148 also provides the MAC or IP address included in the access information to ACL/MAC 144.

Long range wireless communication controller 142 then establishes a communication link with long range wireless communication controller 112 using the supplied MAC or IP address and other access information and encrypts the communication to mobile device 110 using encryption key 147. Where encryption keys 117 and 147 represent a private/private key encryption key, then mobile device 110 also encrypts communication to AP 140 using encryption key 117. Where encryption keys 117 and 147 represent a public key portion of a public/private key encryption key, then AP 140 can provide a public key to mobile device 110 for encrypting communications from mobile device 110 to the AP. Once mobile device 110 has established secure communications with AP 140, the AP routes communications from management interface 118 to management application 152 to permit the user of the mobile device to access and control the functionality of data center 100. In a particular embodiment, after mobile device 110 has been authenticated, primary access controller 120 request the encryption key from TWM 146, rather than from TWM 124.

Figure 2:
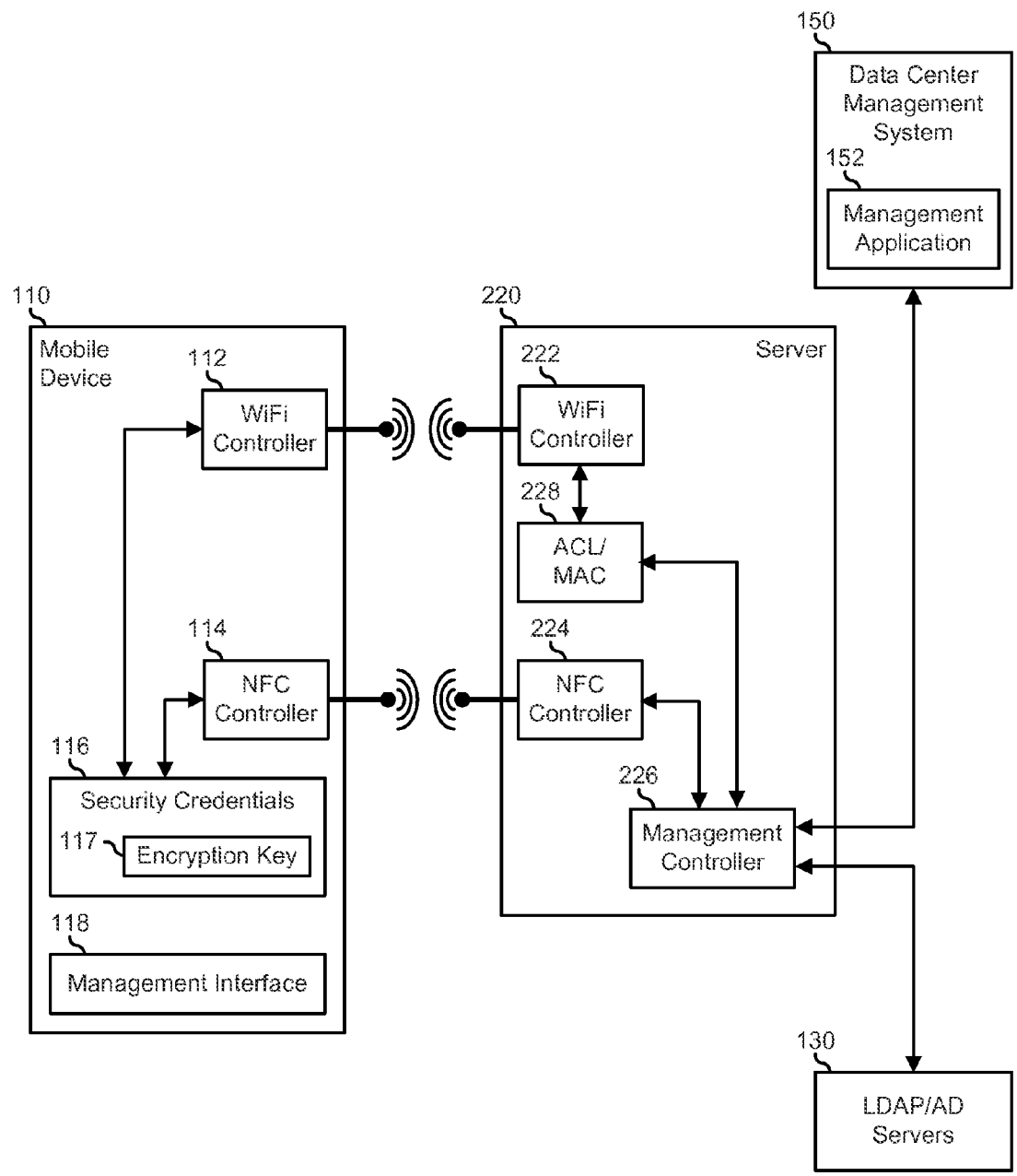
FIG. 2 is a block diagram of a secure data center according to another embodiment of the present disclosure.

FIG. 2 illustrates data center 100 including mobile device 110, a server 220, validation server 130, and data center management system 150. Server 220 includes a long range wireless communication controller 222 that is similar to and operates compatibly with long range wireless communication controller 112, a short range wireless communication controller 224 that is similar to and operates compatibly with short range wireless communication controller 114, a management controller 226, and an ACL/MAC 228. When mobile device 110 is located within the range of short range wireless communication controllers 114 and 224, communication is initiated between the mobile device and server 220. In particular, mobile device 120 communicates security credential 116 to server 220. Management controller 226 receives security credential 116 and verifies that the user associated with the security credential is authorized to access and control operations of data center 100 via management system 150. As such, management controller 226 verifies the identity associated security credential 116 by checking the security credential against a database resident on server 220, or by checking the security credential against validation server 130.

If security credential 116 is not validated by management controller 226, then mobile device 110 is denied access to any other resources of data center 100, including connectivity to AP 140. If security credential 116 is validated, then mobile device 110 provides the access information to server 220. Management controller 226 stores the encryption key for use is secure communication between server 220 and mobile device 110. Management controller 226 also provides the MAC or IP address included in the access information to ACL/MAC 228. Long range wireless communication controller 222 then establishes a communication link with long range wireless communication controller 112 using the supplied MAC or IP address and other access information and encrypts the communication to mobile device 110 using the encryption key. Once mobile device 110 has established secure communications with SERVER 220, the SERVER routes communications from management interface 118 to management application 152 to permit the user of the mobile device to access and control the functionality of data center 100.

Figure 3:
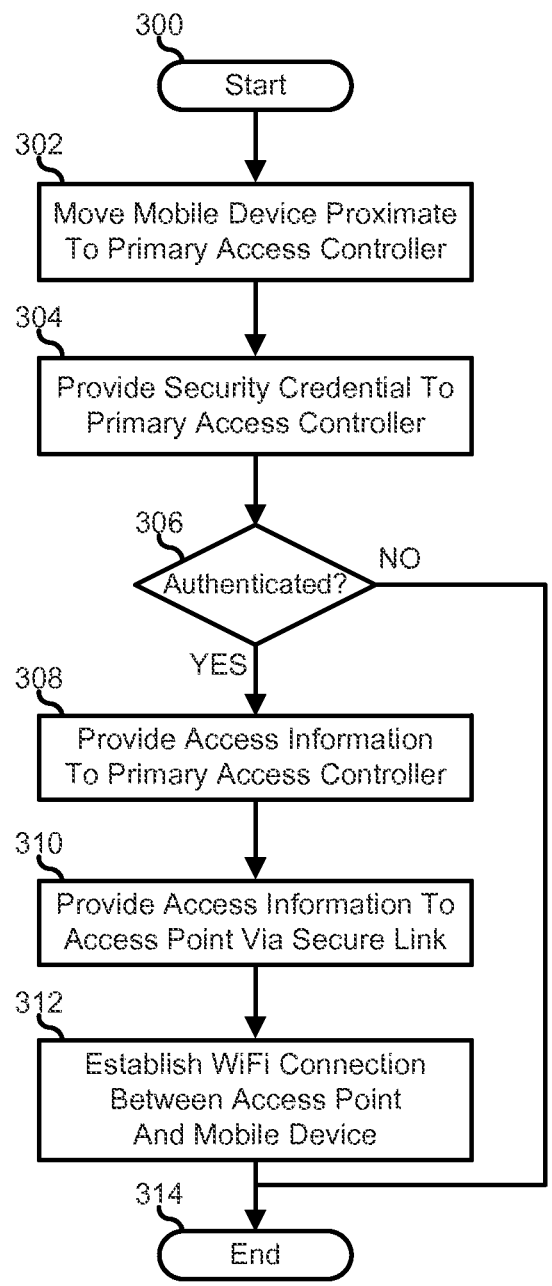
FIG. 3 is a flowchart illustrating a method for providing wireless handheld device security in a data center environment.

FIG. 3 illustrates a method for providing wireless handheld device security in a data center environment starting at block 300. A mobile device with a short range wireless communication controller is moved into the proximity of a similarly equipped primary access controller for a data center in block 302. For example, mobile device 110 can be moved near to primary access controller 120. The mobile device provides a security credential to be authenticated by the primary access controller in block 304. For example, mobile device 110 can provide primary access controller 120 with a security credential that is checked against a local database or against validation server 130.

A decision is made as to whether or not the mobile device is authenticated by the primary access controller in decision block 306. If not, the "NO" branch of decision block 306 is taken and the method ends in block 314. If the mobile device is authenticated by the primary access controller, the "YES" branch of decision block 306 is taken and the mobile device provides access information to the primary access controller in block 308. For example, mobile device 110 can provide encryption key 117, a MAC address, an IP address, another unique identifier, or a combination thereof, to primary access controller 120. The primary access controller provides the access information to an access point via a secure link in block 310. For example, primary access controller 120 can be connected to AP 140 via secure link 128 to provide the access information to the AP. The access point is equipped with a long range wireless communication controller and establishes a connection with the similarly equipped mobile device in block 312, and the method ends in block 314. For example, AP 140 can connect to mobile device 110 via long range wireless communication controllers 112 and 142.

Figure 4:
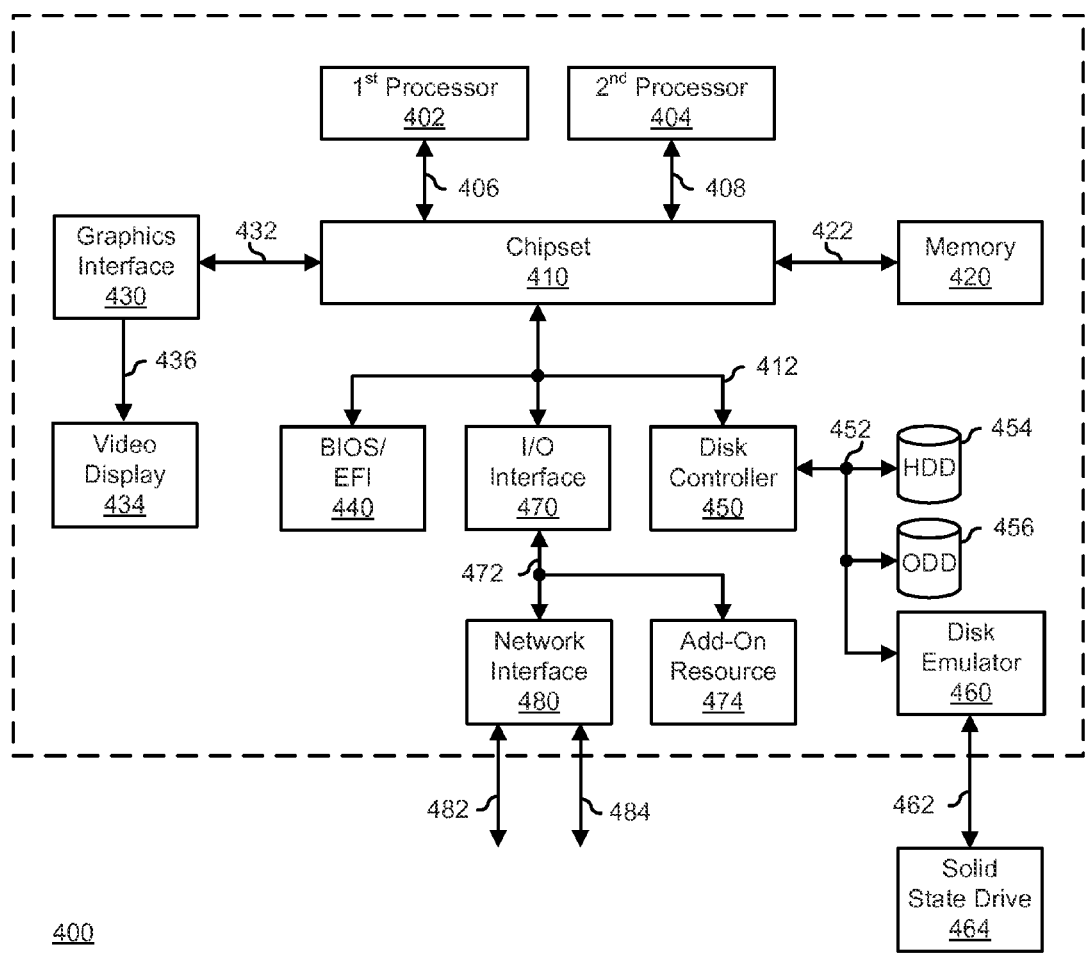
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), unembedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480.

Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of Memory, or a combination thereof.

BIOS/EFI module 440, disk controller 450, and I/O interface 470 are connected to chipset 410 via an I/O channel 412. An example of I/O channel 412 includes a Peripheral Component interconnect (PCD interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EH module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474 and to network interface, 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a diff type. Add-on resource 474 can include a data storage system, an additional graphics interface, a network interface card. (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

The skilled artisan will recognize that, where a particular device type, standard, or operation is specified, that suitable alternatives as needed or desired can be incorporated along with the teachings herein. For example, where the present disclosure describes network communications such as Ethernet communications, other communication standards, hardware, or software can be utilized to provide communications of sufficient bandwidth to perform the operations, teachings, and methods as disclosed herein.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system, comprising:
    an access controller including a short range wireless communication controller; and
    an access point including a long range wireless communication controller, wherein the access point is coupled to the access controller via a secure link;
    wherein the access controller:
        receives a security credential from a mobile device via the short range wireless communication controller;
        authenticates the mobile device based on the security credential;
        generates an encryption key in response to authenticating the mobile device;
        provides the encryption key to the mobile device via the short range wireless communication controller;
        receives access information from the mobile device via the short range wireless communication controller; and
        provides the access information and the encryption key to the access point via the secure link; and
    wherein the access point:
        uses the access information to connect to the mobile device via the long range wireless communication controller; and
        encrypts communications with the mobile device over the long range wireless communication controller with the encryption key.

2. The system of claim 1, wherein the encryption key comprises a private key for a symmetrical key encryption.

3. The system of claim 2, wherein, in providing the encryption key to the mobile device, the access controller further encrypts the encryption key.

4. The system of claim 1, wherein the encryption key comprises a public key for an asymmetrical key encryption.

5. The system of claim 1, wherein the access information includes at least one of a Media Access Control address, an Internet Protocol address, and a unique identifier for the mobile device.

6. The system of claim 1, wherein the short range wireless communication controller comprises a Near Field Communication device.

7. The system of claim 1, wherein the long range wireless communication controller comprises a WiFi device.

8. The system of claim 1, wherein the short range wireless communication controller provides for communication between the access controller and the mobile device at a range of less than eighteen inches.

9. A method comprising:
    receiving, at a short range wireless communication controller of an access controller for a data center, a security credential from a mobile device via the short range wireless communication controller;
    authenticating, by the access controller, the mobile device based upon the security credential;
    generating, by the access controller, an encryption key in response to authenticating mobile device;
    providing, by the access controller, the encryption key to the mobile device via the short range wireless communication controller;
    receiving, by the access controller, access information from the mobile device via the short range wireless communication controller;

providing the access information and the encryption key to an access point of the data center via a secure link between the access point and the access controller, wherein the access point includes a long range wireless communication controller;

establishing, by the access point, a connection to the mobile device via the long range wireless communication controller, wherein the connection is established using the access information; and encrypting, by the access point, communications with the mobile device over the long range wireless communication controller with the encryption key.

10. The method of claim 9, wherein the encryption key comprises a private key for a symmetrical key encryption.

11. The method of claim 10, wherein, in providing the encryption key to the mobile device, the access controller further encrypts the encryption key.

12. The method of claim 9, wherein the encryption key comprises a public key for an asymmetrical key encryption.

13. The method of claim 9, wherein the access information includes at least one of a Media Access Control address, an Internet Protocol address, and a unique identifier for the mobile device.

14. The method of claim 9, wherein the short range wireless communication controller comprises a Near Field Communication device.

15. The method of claim 9, wherein the long range wireless communication controller comprises a WiFi device.

16. The method of claim 9, wherein the short range wireless communication controller provides for communication between the access controller and the mobile device at a range of less than eighteen inches.

17. A non-transitory computer-readable medium including code for performing a method, the method comprising:

receiving, at a short range wireless communication controller of an access controller, a security credential from a mobile device via the short range wireless communication controller;

authenticating, by the access controller, the mobile device based upon the security credential;

receiving, by the access controller, access information from the mobile device via the short range wireless communication controller;

generating, by the access controller, an encryption key in response to authenticating the mobile device;

providing, by the access controller, the encryption key to the mobile device via the short range wireless communication controller;

providing the access information and the encryption key to an access point via a secure link between the access point and the access controller, wherein the access point includes a long range wireless communication controller;

establishing, by the access point, a connection to the mobile device via the long range wireless communication controller, wherein the connection is established using the access information; and encrypting communications with the mobile device over the lon range wireless communication controller with the encryption key.

18. The computer-readable medium of claim 15, wherein the access information includes at least one of a Media Access Control address, an Internet Protocol address, and a unique identifier for the mobile device.

19. The computer-readable medium of claim 15, wherein the short range wireless communication controller comprises a Near Field Communication device.

20. The computer-readable medium of claim 17, wherein the short range wireless communication controller provides for communication between the access controller and the mobile device at a range of less than eighteen inches.

* * * * *